Nov. 24, 1959     E. J. DIEBOLD     2,914,702
ADJUSTABLE INSTANTANEOUS OVERLOAD TRIP DEVICE
Filed June 6, 1957                        2 Sheets-Sheet 1
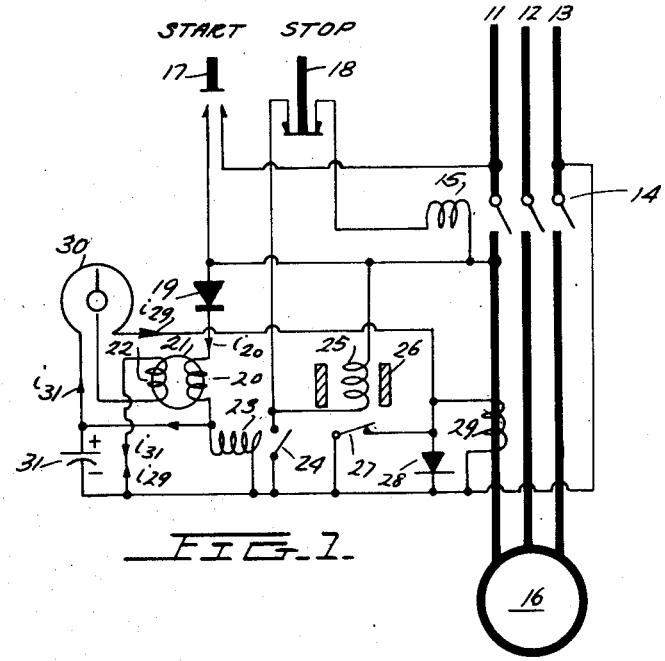
INVENTOR.
EDWARD JOHN DIEBOLD
BY *Ostrolenk, Faber,*
*Gerb & Soffen*
ATTORNEYS

United States Patent Office 2,914,702
Patented Nov. 24, 1959

2,914,702

ADJUSTABLE INSTANTANEOUS OVERLOAD TRIP DEVICE

Edward John Diebold, Palos Verdes Estates, Calif., assignor to I-T-E Circuit Breaker Company, Philadelphia, Pa., a corporation of Pennsylvania Application June 6, 1957, Serial No. 664,039

19 Claims. (Cl. 317—13)

My invention relates to a trip circuit for a circuit interrupter which controls the energization of the tripping means of the interrupter in such a way that high starting transient currents will be distinguished from overload currents during normal load operation.

At the present time, overload trip arrangements for circuit interrupters or circuit controllers such as motor starters include thermal trip units which are insensitive enough as to not cause automatic opening of the motor starter during the initial high transient current conditions when the motor is started. Because the thermal trip units must be constructed in this manner, they are relatively slow operating under an overload condition on the motor. That is, there is a built-in time delay in the trip unit, this being an undesirable condition since it may allow destruction of a load being driven by the motor or of the motor itself.

The essence of the instant invention is to provide an instantaneous overload trip device for circuit interrupters such as motor starters which will not operate responsive to the initial inrush current of the motor and yet will give a very rapid operation of the motor starter responsive to an overload during normal operating conditions or during a period after the high starting transients disappear. The limit constituting an overload is adjustable at will to coincide with changing operating conditions.

The principle of my invention is to utilize a saturable type reactor in a circuit including the trip means of the circuit interrupting device wherein control of the flux of the saturable reactor will control the energization or deenergization of the trip means.

Thus the saturable reactor may be connected in series with a trip unit having a normally energized winding, the saturable reactor being controlled to present an extremely low impedance to the circuit including the energizing winding during transient starting conditions and during normal load operation. When, however, there is an overload condition measured in the load circuit, then the saturable reactor impedance may be made extremely large to thereby cut off the current through the energizing winding and allow tripping of the circuit interrupter within a very short time.

In one embodiment of the above system, the control circuitry for the saturable type reactor may comprise a first input circuit or biasing circuit which biases the saturable reactor as a function of the load current. This current may then be compared to some standard current which energizes another winding of the saturable reactor so that when the net difference between the energization of the two windings indicates that there is an overload in the load circuit, the saturable reactor flux may operate so as to initiate deenergization of the energizing winding of the interrupting device.

In some cases, it may be desirable to utilize a positive feed back means which will accelerate the flux reversal of the saturable reactor and with this means, I have found that I can cause deenergization of an energizing coil within two cycles of the frequency with which the saturable reactor is being energized.

In order to prevent the saturable reactor from operating during the high initial transient condition, I provide a third and blocking circuit which provides a high D.-C. bias on the saturable reactor core which is sufficiently high to override any opposing energization applied to the core, this blocking D.-C. bias being removed once the transient conditions die down to steady state conditions.

In one embodiment of this novel blocking circuit, I connect an A.-C. voltage across a rectifying device responsive to closing of the motor starter. The rectified voltage is then applied across an adjustable resistor which is connected in a closed series relationship with the D.-C. biasing winding for the initial blocking of the saturable reactor and a capacitor. Clearly, the time during which a current will pass through this biasing winding of the saturable reactor is determined by the time constant of the resistor and capacitor connected in the closed series relationship with the D.-C. biasing coil hereinafter called the blocking coil. Thus, by varying the resistor, the length of time the blocking bias will be effective is easily controlled so that the circuit may be easily adapted to substantially any load condition.

In another embodiment of this novel blocking circuit, a time delay relay system may be used to apply D.-C. voltage to the blocking coil for a predetermined time.

Among the many advantages of my novel invention, it is to be specifically noted that it may be a completely static device utilizing no movable or unreliable components. Furthermore, my novel device may be easily adapted to any existing installation and it is easily adjustable to meet the starting transient conditions and required overload trip condition of any particular nature.

With the use of positive feed back circuitry, my novel adjustable instantaneous trip system is operable within two cycles of the input power to the saturable reactor so that the tripping time after the occurrence of an overload current may be made as small as desired by utilizing relatively high frequency drives for the saturable reactor system.

Furthermore, my novel device may be utilized in the control of tripping devices such as the holding coil of a motor starter when this holding coil is either A.-C. or D.-C. actuated by a simple change in the control of the saturable reactor. This is true since the saturable reactor of my invention and its control circuitry forms a magnetic amplifier with the energizing winding of the trip unit connected in the amplifier output circuit. Thus, as is well known, the current in the control circuit of the magnetic amplifier may be either A.-C. or D.-C. with simple modification of the amplifier circuitry.

Accordingly, a primary object of my invention is to provide a novel overload trip means for circuit interrupters which can distinguish between a high initial transient current and an overload current during normal load operation.

Another object of my invention is to provide a novel instantaneous trip device which is static in nature and can be connected installed in existing installations.

Another object of my invention is to provide a novel instantaneous trip means which is easily adjustable for overload trip conditions and for suppression during initial transient conditions, making the circuit inoperative for an adjustable period of time during starting conditions.

Another object of my invention is to provide a novel instantaneous overload trip means for motor starters which ignores the initial high transient currents during motor starting conditions and is fast acting responsive to an adjustably selected overload condition.

Another object of my invention is to provide an overload trip means for motor starters which includes saturable reactor means for controlling the energization of the motor starter trip unit.

Still another object of my invention is to provide a magnetic amplifier control of a motor starter energizing winding whereby the energizing winding is deenergized during overload conditions through the magnetic amplifier and the magnetic amplifier circuitry is maintained inoperative during motor starting conditions.

Another object of my invention is to utilize magnetic amplifier control of a motor starter trip device wherein positive feed back means are provided to cause rapid deenergization of the trip unit once an overload current is sensed by an overload current sensing means.

Yet another object of my invention is to maintain a magnetic amplifier inoperative during high starting transient conditions of a load circuit by connecting a blocking winding of the magnetic amplifier in series with a resistance-capacitance circuit which has a voltage impressed thereon at the time the circuit is started.

These and other objects of my invention will become apparent from the following description when taken in connection with the drawings in which:

Figure 1 shows one embodiment of my novel invention wherein relay devices are utilized for maintaining the saturable reactor saturated during starting conditions.

Figure 2 shows another embodiment of my novel invention based on the principles of operation set forth in Figure 1 while being a completely static device for the energization of a D.-C. control coil.

Figure 3:
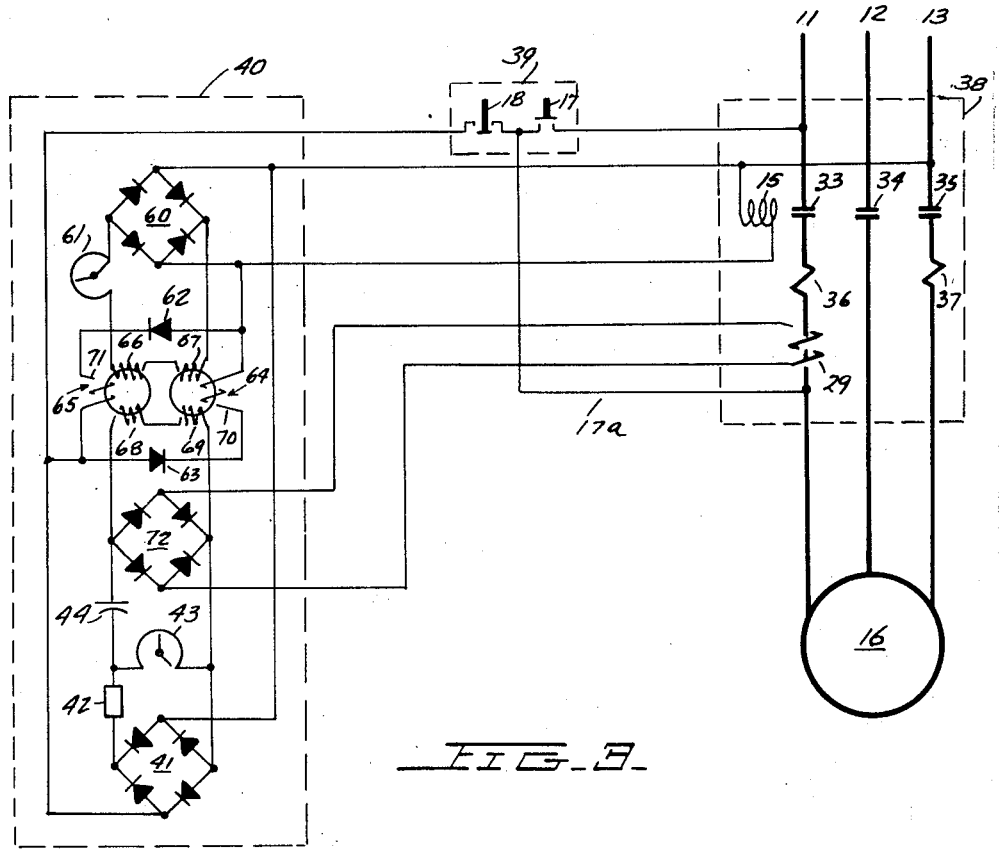
Figure 3 is similar to the embodiment of Figure 2 but shows the circuit as being adapted for energization of an A.-C. motor starter coil.

Referring first to Figure 1, a three phase power source including phases 11, 12 and 13 is connected to a three phase motor load 16 through a three phase contacting device having an energizing or control winding 15 schematically indicated within block 14.

It is to be noted that while the load set forth herein comprises a motor load and that the control device 14 is a motor starter control device, that the dotted box 14 could indicate any desired type of circuit interrupter and, similarly, the load could be of any desired type. For the purposes of the instant application, however, it is only necessary that deenergization of control winding 15 will cause contact disengagement of the interrupter contacts and that energization of coil 15 will cause closing of the contacts. Clearly, however, this sequence could be reversed wherein energization of the control winding could cause contact disengagement with appropriate changes in the circuitry to be described hereinafter.

Control of the motor starter device 14 is achieved through the starting switch 17 and the stop switch 18 in the manner to be described hereinafter, wherein the start switch 17 is a normally opened contact device whereas the stop switch 18 is a normally closed contact device.

The start switch 17 is connected in series with a diode 19 and a winding 20 of the saturable reactor 21 which saturable reactor, as will be seen hereinafter, controls the energization of coil 15 and thereby controls the interrupter 14.

Saturable reactor 21 has a further auxiliary winding 22 thereon which, as will be seen hereinafter, receives both positive feed back energization as well as energization from load current sensing means. The main winding 20 of saturable reactor 21 is connected in series with relay winding 23 which is associated with a contact 24. Contact 24 is connected to one side of a time delay relay coil 25. Time delay relay coil 25 has a short circuited copper winding 26 associated therewith which prevents a rapid build up of magnetic flux within the relay core (not shown) to thereby delay operation of its associated relay contact 27 responsive to initial energization of the coil 25.

Contact 27 is connected in short circuiting relationship with respect to diode 28, diode 28 being connected across the current transformer 29 which is connected to sense the load current conditions. The output of current transformer 29 is also connected in series with rheostat 30 and capacitor 31 wherein capacitor 31 and the left half of rheostat 30 serve positive feed back functions with relation to coil 22 while the right half of the rheostat 30 in conjunction with current transformer 29 serve to energize coil 22 responsive to load current conditions.

The operation of the circuit of Figure 1 is as follows:

In order to start the motor 16, the push button switch 17 is closed. This completes a circuit from phase 11 through switch 17, rectifier 19, winding 20 of saturable reactor 21, relay winding 23, and back to phase 13. A current will flow in the circuit either immediately or as soon as any residual flux within the core of saturable reactor 21 is reversed to thereby energize relay coil 23 and close the normally open contact 24.

A new circuit is then completed from phase 11 through switch 17, coil 15, switch 18, contact 24, and back to phase 13. Therefore, the energizing coil 15 of the circuit interrupter 16 is energized to close the circuit interrupter contacts. Furthermore, the starting switch 17 is by-passed by the motor starter contact in phase 11 and this circuit may now be disregarded.

Since the energizing coil 25 is in parallel with coil 15, and switch 18, coil 25 will be energized at the same time as is coil 15. Since, however, the relay associated with coil 25 is of the time delay type, operation of its associated contacts will be delayed for a predetermined time, this time being adjusted to be the time taken for transient or starting currents in the load circuit to die down to steady state conditions.

While the delay circuit shown in Figure 1 utilizes mechanical relays, it is not necessary that mechanical relays be used (as will be seen in Figures 2 and 3) so that the complete circuit will be a static one. In either case, while the motor 16 is being started and draws its relatively high starting currents, which may be six or seven times as great as the rated current, the current transformer 29 carries a large current but is short circuited in the case of Figure 1 by the contact 27 which is not yet opened. Furthermore, during the starting period, the voltage drop across relay coil 23 charges capacitor 31 up to some direct voltage. A small discharge current shown in Figure 1 as $i_{31}$ flows through the circuit including rheostat 30 and biasing winding 22 of saturable reactor 21. This current magnetizes the core of saturable reactor 21 in the same direction as does the current $i_{20}$ flowing through coil 20 in series with rectifier 19.

Therefore, reactor 21 is fully saturated in the forward direction and the impedance of coil 20 is negligibly small. After the starting transients die down and the time delay of coil 25 and sleeve 26 have been overcome, contact 27 is opened. Rectifier 28 then short circuits current transformer 29 for half cycles and during the other half cycles, a current $i_{29}$ is drawn through coil 22 and the other side of rheostat 30. Current $i_{29}$ opposes the effect of current $i_{31}$ in the coil 22 so that the core of saturable reactor 21 is maintained saturated in the forward direction so long as current $i_{29}$ is smaller than current $i_{31}$.

If, however, during any one cycle the load current increases to some predetermined overload value and the current $i_{29}$ becomes larger than the current $i_{31}$, the current in coil 22 reverses and therefore the flux of the saturable reactor (or at least part of it) is reversed. At the next positive half cycle, the coil 20 will not pass current until it is again saturated in the forward direction whereby the voltage on coil 23 and capacitor 31 is lowered to decrease the current $i_{31}$. At the next half cycle, the current $i_{31}$ is lower than before while the current $i_{29}$ is as high as before so that the magnetic flux of saturable reactor 21 is substantially completely reversed to thereby prevent any further current through the coil 20. When this happens, the coil 23 will be deenergized so that contact 24 opens to deenergize the starter coil 15 and the interrupter contacts will open.

Hence the saturable reactor 21 controls the energization of coil 15 of circuit interrupter 14 responsive to overload conditions as measured by the current transformer 29, this operation being accelerated by the positive feed back effect due to the decrease in voltage of capacitor 31.

It is to be noted that the opening of the circuit as above described depends on the current balance in rheostat 30. If, at any time, this balance is such that the current $i_{29}$ is greater than $i_{31}$, then the saturable reactor 20 is in essence triggered off for subsequently causing the opening of the motor starter contacts. For this reason, the relay 24 need not be an accurately calibrated relay because it is either subjected to the full rectified line to line voltage during normal operating conditions or to a very small residual voltage during overload conditions.

It is to be further noted that coil 15 could be of either the D.-C. or A.-C. type since it is only indirectly affected by the saturable reactor conditions. Thus, the circuitry set forth in Figure 1 is a very flexible one and can clearly be adapted to any existing motor starter installation.

Figure 2 shows a second embodiment of my invention wherein only static components are utilized in conjunction with a motor starter having a D.-C. energizing winding 15. Figure 2 further separates the functions of the various circuit components into the motor starter assembly 38, the start stop box 39 and the control circuitry 40.

The motor starter assembly is comprised of the contacts 33, 34 and 35, heater elements 36 and 37, current transformer 29, and energizing coil 15. It is to be understood that the heater elements 36 and 37 will have trip means associated therewith for tripping the contacts responsive to overload conditions. This type of trip means is well known in the art and will not be further described herein. With the exception of the current transformer 29, it is to be clearly noted that the equipment of group 38 is that of the standard presently used motor starter device. This current transformer 29 can consist of a small through type current transformer which is easily slipped around one of the conductors of phase 11 so that the addition of this component is little trouble to maintenance personnel adapting my novel structure to an existing installation.

The start stop box 39 containing the start switch 17 and stop switch 18 is also used in the presently existing installations and may be utilized as such in my novel invention with the addition of a few simple circuit connections.

The control circuitry of my novel invention is then contained within the dotted box 40 and is comprised of a magnetic amplifier system and the control circuitry therefor. No relays are utilized in the control circuitry since the magnetic amplifier itself is powerful enough to directly drive coil 15, the output of the amplifier being a half-way rectifier D.-C. current.

In the case of Figure 2, the blocking of the magnetic amplifier during transient starting conditions is achieved by a novel circuit connected to an auxiliary biasing winding of the saturable reactor of the amplifier rather than through a time delay relay means as in the case of Figure 1.

This circuit as will be described hereinafter is comprised of the bridge rectifier 41, resistor 42, rheostat 43 and capacitor 44, wherein the saturable reactor 45 of magnetic amplifier has a blocking winding 46 connected in series relation with respect to rheostat 43 and capacitor 44. Saturable reactor 45 is further provided with windings 47 and 48 which are in reality a single winding having a center tap connected in series with rectifier 49.

A positive feed back path is provided in Figure 2 through the rheostat 50, the feed back circuit including winding 47 and capacitor 51.

The load sensing circuit, as was the case in Figure 1, is comprised of the current transformer 29 operating in conjunction with resistor 52 and rectifier 53, this circuit operating on winding 47.

The operation of the circuit of Figure 2 is as follows:
When starting switch 17 is closed, a circuit is completed from phase 11 through switches 17 and 18, rectifier 49, winding 48, closing coil 15, and power line 13. During this initial starting condition, there is no current through the current transformer 29 and therefore there is no negative bias on the coil 47. The rectifier 41 supplies a large positive bias to coil 46 since beginning with the initial closing of start button 17, the output voltage of rectifier 41 changes from zero to full voltage, whereby a current flows in the closed circuit including rheostat 43, winding 46, and capacitor 44. The magnitude and length of time that this current flows is determined by the time constant of the circuit and by its resistance. This circuit, however, is preferably dimensioned that the saturable reactor will be saturated in a forward direction by current flowing through winding 46 for a time at least as long as the time required for the transient conditions due to motor starting to die down to steady state conditions.

Clearly, this time and the magnitude of the current are easily controlled by adjustment of the rheostat 43.

Therefore, during the initial starting conditions reactor 45 is maintained saturated and coil 48 has a negligibly small impedance in the circuit including phase 13, coil 15, winding 48, rectifier 49, switches 18 and 17, and phase 11. Hence a large current flows through the last named circuit so that winding 15 is sufficiently energized to close contacts 33, 34 and 35. With the closing of contact 33, the amplifier is energized over the wire 17a and switch 17, which may be of the push button normally open type, may be released without deenergizing the coil circuit or amplifier circuit.

When the amplifier operates, capacitor 51 will assume the potential across coil 15 because of their parallel connection and will be charged in a positive direction as indicated in Figure 2. A small current $i_{50}$ flows from the capacitor 51 through rheostat 50, coil 47, and back to the capacitor, this current forming both a standard current against which the load current may be compared for initiating operation of the motor starter as well as providing positive feed back means for accelerating operating during overload conditions.

The current transformer 29 produces a voltage drop on resistor 52 which is rectified by rectifier 53 to produce a current $i_{52}$ through the coil 47 in opposition to the standard current $i_{50}$. So long as current $i_{50}$ is larger than current $i_{52}$, the magnetic amplifier is biased in the forward direction and coil 48 will have a negligible impedance. Hence energizing current can flow through coil 15 to maintain contactors 33, 34 and 35 in their closed condition.

It is to be noted that during starting conditions, the current $i_{52}$ is appreciably larger than the current $i_{50}$. However, the heretofore described blocking circuit connected to winding 46 is so dimensioned that during this initial period and prior to the time that the current $i_{50}$ is established, its decreasing current is still sufficiently large to prevent flux reversal of the saturable reactor 45 by the current $i_{52}$, this blocking current dying down to lower values only after the current $i_{50}$ has been established. Thus the magnetic amplifier remains saturated in the forward direction only so long as the current $i_{50}$ is larger than the current $i_{52}$.

When, however, the load of the motor exceeds the limit given by the adjustment of rheostat 50 which sets the standard current $i_{50}$, the bias current $i_{52}$ increases beyond the limit given by the standard.

Thus the magnetic amplifier assumes a high impedance and its output current drops so that the current through the coil 15 drops. This then causes a drop in voltage across coil 15 which in turn reduces the voltage across the capacitor 51 to thus reduce the bias current $i_{50}$ to immediately send the output voltage of the amplifier to zero.

The contacts 33, 34 and 35 are then opened and with this, the amplifier loses its operating potential. Thus the circuit of Figure 2, in accordance with the principle of my novel invention, can distinguish between transient starting condition, and can still initiate a substantially instantaneous trip action responsive to the occurence of an overload in the load circuit.

Furthermore, the unit is easily adapted to existing installations utilizing a D.-C. control coil and its components are completely static. Still further, the system is completely and easily adjustable for both the length of time that starting transients will flow (by means of rheostat 43) as well as to the level of overload current at which instantaneous trip is desirable (by means of rheostat 50).

Clearly, low overload conditions below the value at which instantaneous trip is required can be dealt with by the pre-existing thermal elements 36 and 37 which will operate in their previously used manner. Here, however, it is to be noted that an additional advantage may be achieved in the use of thermal overload elements since they may now be made more sensitive units because they no longer have to respond to the high overload currents. Therefore, their calibration may be much more accurate than is presently possible because of the present physical requirements of response to the relatively high overloads which should be substantially instantaneously interrupted.

Figure 3 shows how the circuitry of Figure 2 may be modified when my novel device is applied to a motor starter utilizing an A.-C. energized coil 15 rather than the D.-C. coil 15 of Figure 2.

In Figure 3, components 38 and 39 are identical to those of Figure 2 and in a similar manner the blocking circuit including rectifier 41, resistor 42, potentiometer 43 and capacitor 44 is similar to that of Figure 2.

In the case of Figure 3, any voltage drop across coil 15 is impressed across rectifier 60 which has a rheostat 61 and D.-C. control windings 66 and 67 of saturable reactors 64 and 65 in series therewith. Saturable reactors 64 and 65 which comprise the A.-C. magnetic amplifier includes rectifiers 62 and 63 which are in series with output windings 70 and 71 respectively for the output circuit and windings 68 and 69 respectively which are connected to the starting blocking circuit including the capacitor 44 and potentiometer 43.

The load sensing current transformer 29 is then connected to a rectifier 72 which also uses windings 69 and 68 as input windings to the magnetic amplifier. Thus the magnetic amplifier of Figure 3 is an A.-C. magnetic amplifier utilizing D.-C. control.

The operation of the circuit of Figure 3 is as follows:

When the start push button 17 is closed, a voltage is applied to the circuit including switches 17 and 18, the parallel arrangement of rectifier 63 and winding 70, and winding 71 and rectifier 62 respectively, coil 15, phase 13, and phase 11.

At the same time, a voltage is applied to rectifier 41 whereby the blocking circuit including capacitor 44 and potentiometer 43 apply a strong positive D.-C. bias to coils 68 and 69 to maintain each of cores 64 and 65 saturated regardless of the opposing flux from any other winding during the time that starting transients exist in the load circuit. Since the saturable reactors 64 and 65 are maintained saturated, it is clear that the circuit including windings 70 and 71 will pass a high A.-C. current through the energizing coil 15 to allow closure of contacts 33, 34 and 35.

With the closure of these contacts, switch 17 is bypassed as in the case of Figure 2 by a connection 17a so that the switch 17 may be released.

The voltage drop across coil 15 is applied to rectifier 60 and a D.-C. current flows through the potentiometer 61 and biasing windings 66 and 67, this current being the standard current against which load current is to be measured for instantaneous trip operation.

The current flowing through potentiometer 61 will serve a positive feed back function to cause a rapid deenergization of coil 15. The load current produces a voltage which is rectified by rectifier 72 and applied to windings 68 and 69 of transductors 64 and 65 respectively, this current being in a direction which magnetizes the core of transductors 64 and 65 in a direction opposite to that in windings 66 and 67.

During normal operation of motor 16, however, the bias in windings 66 and 67 is sufficient to overcome the bias at windings 68 and 69 so as to maintain the transductors 64 and 65 saturated. When, however, the load current increases beyond a predetermined magnitude, the current through windings 68 and 69 becomes sufficient to overcome the bias at windings 66 and 67 to thereby reverse a portion of the flux of transductors 64 and 65. This subsequently causes the output voltage of the amplifier applied to winding 15 to be decreased. The decrease of the voltage applied to winding 15 causes a decrease in the output voltage of rectifier 60 and therefore a decrease in the current flowing through coils 66 and 67 so that the output voltage will subsequently drop to zero in a very short time. Thus the coil 15 will be deenergized to allow opening of contacts 33, 34 and 35 to thereby cut off the power supply of the amplifier.

In the case of Figure 3, all of the advantages set forth in Figure 2 are available. That is to say, the motor starter components utilized are all of the standard type and the magnitude at which instantaneous trip is desired as well as the length of time that amplifier operation is suppressed during transient starting conditions is easily adjustable by rheostats 61 and 43 respectively.

Furthermore, the unit is easily adapted to any existing motor control device utilizing an A.-C. energized coil such as coil 15.

Although I have here disclosed preferred embodiments of my novel invention, many modifications and variations will now be obvious to those skilled in the art and I prefer therefore to be limited, not by the specific disclosure herein, but only by the appended claims.

I claim:

1. A trip device for circuit interrupters having a trip element therein, said circuit interrupter being operated responsive to a change in energization of said trip element; said trip device comprising a saturable reactor and control circuits therefor, said saturable reactor being electrically connected to said trip element to control the energization thereof responsive to the flux condition of said saturable reactor; said control circuits comprising a first circuit for biasing said saturable reactor flux in a first direction and being responsive to current through said circuit interrupter, and a second circuit connected to apply a predetermined bias to said saturable reactor in a second direction; said saturable reactor normally being biased to saturation in said second direction; the flux of said saturable reactor being reversed toward said first direction when said current through said circuit interrupter exceeds a predetermined value to thereby change the energization of said trip element and operate said circuit interrupter; said second circuit being connected to have de-energization thereof initiated responsive to an initial reversal of flux in said saturable reactor.

2. A trip device for circuit interrupters having a trip element therein, said circuit interrupter being operated responsive to a change in energization of said trip element; said trip device comprising a saturable reactor and control circuits therefor, said saturable reactor being electrically connected to said trip element to control the energization thereof responsive to the flux condition of said saturable reactor; said control circuit comprising a first circuit for biasing said saturable reactor flux in a first direction and being responsive to current through said circuit interrupter, and a second circuit connected to apply a predetermined bias to said saturable reactor in a second direction; said saturable reactor normally being biased to saturation in said second direction; the flux of said saturable reactor being reversed toward said first direction when said current through said circuit interrupter exceeds a predetermined value to thereby change the energization of said trip element and operate said circuit interrupter; said second circuit including positive feed back means for rapidly decreasing said predetermined bias responsive to an initial flux change in said saturable reactor from said second direction to said first direction.

3. A trip device for circuit interrupters having a trip element therein, said circuit interrupter being operated responsive to a change in energization of said trip element; said trip device comprising a saturable reactor and control circuits therefor, said saturable reactor being electrically connected to said trip element to control the energization thereof responsive to the flux condition of said saturable reactor; said control circuits comprising a first circuit for biasing said saturable reactor flux in a first direction and being responsive to current through said circuit interrupter, and a second circuit connected to apply a predetermined bias to said saturable reactor in a second direction; said saturable reactor normally being biased to saturation in said second direction; the flux of said saturable reactor being reversed toward said first direction when said current through said circuit interrupter exceeds a predetermined value to thereby change the energization of said trip element and operate said circuit interrupter; said second circuit being connected to have de-energization thereof initiated responsive to an initial reversal of flux in said saturable reactor; said control circuits for said saturable reactor further including a blocking circuit; said blocking circuit being connected to said saturable reactor to strongly bias said saturable reactor in said second direction for a predetermined length of time after the closing of said circuit interrupter to prevent reversal of the flux of said saturable reactor to said first direction regardless of the magnitude of current through said circuit interrupter.

4. A trip device for circuit interrupters having a trip element therein, said circuit interrupter being operated responsive to a change in energization of said trip element; said trip device comprising a saturable reactor and control circuits therefor, said saturable reactor being electrically connected to said trip element to control the energization thereof responsive to the flux condition of said saturable reactor; said control circuits comprising a first circuit for biasing said saturable reactor flux in a first direction and being responsive to current through said circuit interrupter, and a second circuit connected to apply a predetermined bias to said saturable reactor in a second direction; said saturable reactor normally being biased to saturation in said second direction; the flux of said saturable reactor being reversed toward said first direction when said current through said circuit interrupter exceeds a predetermined value to thereby change the energization of said trip element and operate said circuit interrupter; said second circuit including positive feed back means for rapidly decreasing said predetermined bias responsive to an initial flux change in said saturable reactor from said second direction to said first direction; said control circuits for said saturable reactor further including a blocking circuit; said blocking circuit being connected to said saturable reactor to strongly bias said saturable reactor in said second direction for a predetermined length of time after the closing of said circuit interrupter to prevent reversal of the flux of said saturable reactor to said first direction regardless of the magnitude of current through said circuit interrupter.

5. A trip device for circuit interrupters having a trip element therein, said circuit interrupter being operated responsive to a change in energization of said trip element; said trip device comprising a saturable reactor and control circuits therefor, said saturable reactor being electrically connected to said trip element to control the energization thereof responsive to the flux condition of said saturable reactor; said control circuits comprising a first circuit for biasing said saturable reactor flux in a first direction and being responsive to current through said circuit interrupter, and a second circuit connected to apply a predetermined bias to said saturable reactor in a second direction; said saturable reactor normally being biased to saturation in said second direction; the flux of said saturable reactor being reversed toward said first direction when said current through said circuit interrupter exceeds a predetermined value to thereby change the energization of said trip element and operate said circuit interrupter; said second circuit being connected to have de-energization thereof initiated responsive to an initial reversal of flux in said saturable reactor; said control circuits for said saturable reactor further including a blocking circuit; said blocking circuit being connected to said saturable reactor to strongly bias said saturable reactor in said second direction for a predetermined length of time after the closing of said circuit interrupter to prevent reversal of the flux of said saturable reactor to said first direction regardless of the magnitude of current through said circuit interrupter; and relay means for disconnecting said blocking circuit from said saturable reactor after said predetermined length of time.

6. A trip device for circuit interrupters having a trip element therein, said circuit interrupter being operated responsive to a change in energization of said trip element; said trip device comprising a saturable reactor and control circuits therefor, said saturable reactor being electrically connected to said trip element to control the energization thereof responsive to the flux condition of said saturable reactor; said control circuits comprising a first circuit for biasing said saturable reactor flux in a first direction and being responsive to current through said circuit interrupter, and a second circuit connected to apply a predetermined bias to said saturable reactor in a second direction; said saturable reactor normally being biased to saturation in said second direction; the flux of said saturable reactor being reversed toward said first direction when said current through said circuit interrupter exceeds a predetermined value to thereby change the energization of said trip element and operate said circuit interrupter; said second circuit including positive feed back means for rapidly decreasing said predetermined bias responsive to an initial flux change in said saturable reactor from said second direction to said first direction; said control circuits for said saturable reactor further including a blocking circuit; said blocking circuit being connected to said saturable reactor to strongly bias said saturable reactor in said second direction for a predetermined length of time after the closing of said circuit interrupter to prevent reversal of the flux of said saturable reactor to said first direction regardless of the magnitude of current through said circuit interrupter; said second circuit and said blocking circuit being adjustable to thereby adjust the magnitude of circuit interrupter current at which the energization of said energizing coil will be changed and the length of time said blocking circuit will be operative.

7. A trip device for circuit interrupters having a trip element therein, said circuit interrupter being operated responsive to a change in energization of said trip element; said trip device comprising a saturable reactor and control circuits therefor, said saturable reactor being electrically connected to said trip element to control the energization thereof responsive to the flux condition of said saturable reactor; said control circuits comprising a first circuit for biasing said saturable reactor flux in a first direction and being responsive to current through said circuit interrupter, and a second circuit connected to apply a predetermined bias to said saturable reactor in a second direction; said saturable reactor normally being biased to saturation in said second direction; the flux of said saturable reactor being reversed toward said first direction when said current through said circuit interrupter exceeds a predetermined value to thereby change the energization of said trip element and operate said circuit interrupter; said second circuit being connected to have de-energization thereof initiated responsive to an initial reversal of flux in said saturable reactor; said control circuits for said saturable reactor further including a blocking circuit; said blocking circuit being connected to said saturable reactor to strongly bias said saturable reactor in said second direction for a predetermined length of time after the closing of said circuit interrupter to prevent reversal of the flux of said saturable reactor to said first direction regardless of the magnitude of current through said circuit interrupter; said blocking circuit including resistance-capacitance circuit which is energized in series with a winding of said saturable reactor and a D.-C. voltage responsive to closing of said circuit interrupter.

8. A trip device for circuit interrupters having a trip element therein, said circuit interrupter being operated responsive to a change in energization of said trip element; said trip device comprising a saturable reactor and control circuits therefor, said saturable reactor being electrically connected to said trip element to control the energization thereof responsive to the flux condition of said saturable reactor; said control circuits comprising a first circuit for biasing said saturable reactor flux in a first direction and being responsive to current through said circuit interrupter, and a second circuit connected to apply a predetermined bias to said saturable reactor in a second direction; said saturable reactor normally being biased to saturation in said second direction; the flux of said saturable reactor being reversed toward said first direction when said current through said circuit interrupter exceeds a predetermined value to thereby change the energization of said trip element and operate said circuit interrupter; said second circuit including positive feed back means for rapidly decreasing said predetermined bias responsive to an initial flux change in said saturable reactor from said second direction to said first direction; said control circuits for said saturable reactor further including a blocking circuit; said blocking circuit being connected to said saturable reactor to strongly bias said saturable reactor in said second direction for a predetermined length of time after the closing of said circuit interrupter to prevent reversal of the flux of said saturable reactor to said first direction regardless of the magnitude of current through said circuit interrupter; said blocking circuit including resistance-capacitance circuit which is energized in series with a winding of said saturable reactor and a D.-C. voltage responsive to closing of said circuit interrupter; said resistance-capacitance circuit being adjustable to adjust the length of time blocking current flows through said saturable reactor winding.

9. A trip device for circuit interrupters having a trip element therein, said circuit interrupter being operated responsive to a change in energization of said trip element; said trip device comprising a saturable reactor and control circuits therefor, said saturable reactor being electrically connected to said trip element to control the energization thereof responsive to the flux condition of said saturable reactor; said control circuits comprising a first circuit for biasing said saturable reactor flux in a first direction and being responsive to current through said circuit interrupter, and a second circuit connected to apply a predetermined bias to said saturable reactor in a second direction; said saturable reactor normally being biased to saturation in said second direction; the flux of said saturable reactor being reversed toward said first direction when said current through said circuit interrupter exceeds a predetermined value to thereby change the energization of said trip element and operate said circuit interrupter; said second circuit including positive feed back means for rapidly decreasing said predetermined bias responsive to an initial flux change in said saturable reactor from said second direction to said first direction; said positive feed back circuit including capacitor means dischargeable responsive to initial flux reversal of said saturable reactor to decrease the current of said second circuit.

10. A trip device for circuit interrupters having a trip element therein, said circuit interrupter being operated responsive to a change in energization of said trip element; said trip device comprising a saturable reactor and control circuits therefor, said saturable reactor being electrically connected to said trip element to control the energization thereof responsive to the flux condition of said saturable reactor; said control circuits comprising a first circuit for biasing said saturable reactor flux in a first direction and being responsive to current through said circuit interrupter, and a second circuit connected to apply a predetermined bias to said saturable reactor in a second direction; said saturable reactor normally being biased to saturation in said second direction; the flux of said saturable reactor being reversed toward said first direction when said current through said circuit interrupter exceeds a predetermined value to thereby change the energization of said trip element and operate said circuit interrupter; said second circuit including positive feed back means for rapidly decreasing said predetermined bias responsive to an initial flux change in said saturable reactor from said second direction to said first direction; said positive feed back circuit including capacitor means dischargeable responsive to initial flux reversal of said saturable reactor to decrease the current of said second circuit; said control circuits for said saturable reactor further including a blocking circuit; said blocking circuit being connected to said saturable reactor to strongly bias said saturable reactor in said second direction for a predetermined length of time after the closing of said circuit interrupter to prevent reversal of the flux of said saturable reactor to said first direction regardless of the magnitude of current through said circuit interrupter.

11. A trip device for circuit interrupters having a trip element therein, said circuit interrupter being operated responsive to a change in energization of said trip element; said trip device comprising a saturable reactor and control circuits therefor, said saturable reactor being electrically connected to said trip element to control the energization thereof responsive to the flux condition of said saturable reactor; said control circuits comprising a first circuit for biasing said saturable reactor flux in a first direction and being responsive to current through said circuit interrupter, and a second circuit connected to apply a predetermined bias to said saturable reactor in a second direction; said saturable reactor normally being biased to saturation in said second direction; the flux of said saturable reactor being reversed toward said first direction when said current through said circuit interrupter exceeds a predetermined value to thereby change the energization of said trip element and operate said circuit interrupter; said second circuit including positive feed back means for rapidly decreasing said predetermined bias responsive to an initial flux change in said saturable reactor from said second direction to said first direction; said saturable reactor being part of a magnetic amplifier having said trip element connected to the output thereof, said control circuits forming the input control of said magnetic amplifier for altering the energization of said trip element responsive to a predetermined current through said interrupter.

12. A trip device for circuit interrupters having a trip element therein, said circuit interrupter being operated responsive to a change in energization of said trip element; said trip device comprising a saturable reactor and control circuits therefor, said saturable reactor being electrically connected to said trip element to control the energization thereof responsive to the flux condition of said saturable reactor; said control circuits comprising a first circuit for biasing said saturable reactor flux in a first direction and being responsive to current through said circuit interrupter, and a second circuit connected to apply a predetermined bias to said saturable reactor in a second direction; said saturable reactor normally being biased to saturation in said second direction; the flux of said saturable reactor being reversed toward said first direction when said current through said circuit interrupter exceeds a predetermined value to thereby change the energization of said trip element and operate said circuit interrupter; said second circuit including positive feed back means for rapidly decreasing said predetermined bias responsive to an initial flux change in said saturable reactor from said second direction to said first direction; said control circuits for said saturable reactor further including a blocking circuit; said blocking circuit being connected to said saturable reactor to strongly bias said saturable reactor in said second direction for a predetermined length of time after the closing of said circuit interrupter to prevent reversal of the flux of said saturable reactor to said first direction regardless of the magnitude of current through said circuit interrupter; said saturable reactor being part of a magnetic amplifier having said trip element connected to the output thereof, said control circuits forming the input control of said magnetic amplifier for altering the energization of said trip element responsive to a predetermined current through said interrupter.

13. A trip device for circuit interrupters having a trip element therein, said circuit interrupter being operated responsive to a change in energization of said trip element; said trip device comprising a saturable reactor and control circuits therefor, said saturable reactor being electrically connected to said trip element to control the energization thereof responsive to the flux condition of said saturable reactor; said control circuits comprising a first circuit for biasing said saturable reactor flux in a first direction and being responsive to current through said circuit interrupter, and a second circuit connected to apply a predetermined bias to said saturable reactor in a second direction; said saturable reactor normally being biased to saturation in said second direction; the flux of said saturable reactor being reversed toward said first direction when said current through said circuit interrupter exceeds a predetermined value to thereby change the energization of said trip element and operate said circuit interrupter; said second circuit including positive feed back means for rapidly decreasing said predetermined bias responsive to an initial flux change in said saturable reactor from said second direction to said first direction; said control circuits for said saturable reactor further including a blocking circuit; said blocking circuit being connected to said saturable reactor to strongly bias said saturable reactor in said second direction for a predetermined length of time after the closing of said circuit interrupter to prevent reversal of the flux of said saturable reactor to said first direction regardless of the magnitude of current through said circuit interrupter; said blocking circuit including resistance-capacitance circuit which is energized in series with a winding of said saturabe reactor and a D.-C. voltage responsive to closing of said circuit interrupter; said resistance-capacitance circuit being adjustable to adjust the length of time blocking current flows through said saturable reactor winding; said saturable reactor being part of a magnetic amplifier having said trip element connected to the output thereof, said control circuits forming the input control of said magnetic amplifier for altering the energization of said trip element responsive to a predetermined current through said interrupter.

14. A trip device for circuit interrupters having a trip element therein, said circuit interrupter being operated responsive to a change in energization of said trip element; said trip device comprising a saturable reactor and control circuits therefor, said saturable reactor being electrically connected to said trip element to control the energization thereof responsive to the flux condition of said saturable reactor; said control circuits comprising a first circuit for biasing said saturable reactor flux in a first direction and being responsive to current through said circuit interrupter, and a second circuit connected to apply a predetermined bias to said saturable reactor in a second direction; said saturable reactor normally being biased to saturation in said second direction; the flux of said saturable reactor being reversed toward said first direction when said current through said circuit interrupter exceeds a predetermined value to thereby change the energization of said trip element and operate said circuit interrupter; said second circuit including positive feed back means for rapidly decreasing said predetermined bias responsive to an initial flux change in said saturable reactor from said second direction to said first direction; said control circuits for said saturable reactor further including a blocking circuit; said blocking circuit being connected to said saturable reactor to strongly bias said saturable reactor in said second direction for a predetermined length of time after the closing of said circuit interrupter to prevent reversal of the flux of said saturable reactor to said first direction regardless of the magnitude of current through said circuit interrupter; said saturable reactor being part of a magnetic amplifier having said trip element connected to the output thereof, said control circuits forming the input control of said magnetic amplifier for altering the energization of said trip element responsive to a predetermined current through said interrupter; said trip element being normally energized by D.-C. current when said circuit interrupter is closed; said magentic amplifier having said trip element connected in the output thereof being a D.-C. amplifier which is cut off responsive to flux reversal of said saturable reactor to said first direction.

15. A trip device for circuit interrupters having a trip element therein, said circuit interrupter being operated responsive to a change in energization of said trip element; said trip device comprising a saturable reactor and control circuits therefor, said saturable reactor being electrically connected to said trip element to control the energization thereof responsive to the flux condition of said saturable reactor; said control circuits comprising a first circuit for biasing said saturable reactor flux in a first direction and being responsive to current through said circuit interrupter, and a second circuit connected to apply a predetermined bias to said saturable reactor in a second direction; said saturable reactor normally being biased to saturation in said second direction; the flux of said saturable reactor being reversed toward said first direction when said current through said circuit interrupter exceeds a predetermined value to thereby change the energization of said trip element and operate said circuit interrupter; said second circuit including positive feed back means for rapidly decreasing said predetermined bias responsive to an initial flux change in said saturable reactor from said second direction to said first direction; said control circuits for said saturable reactor further including a blocking circuit; said blocking circuit being connected to said saturable reactor to strongly bias said saturable reactor in said second direction for a predetermined length of time after the closing of said circuit interrupter to prevent reversal of the flux of said saturable reactor to said first direction regardless of the magnitude of current through said circuit interrupter; said blocking circuit including resistance-capacitance circuit which is energized in series with a winding of said saturable reactor and a D.-C. voltage responsive to closing of said circuit interrupter; said resistance-capacitance circuit being adjustable to adjust the length of time blocking current flows through said saturable reactor winding; said saturable reactor being part of a magnetic amplifier having said trip element connected to the output thereof, said control circuits forming the input control of said magnetic amplifier for altering the energization of said trip element responsive to a predetermined current through said interrupter; said trip element being normally energized by D.-C. current when said circuit interrupter is closed; said magnetic amplifier having said trip element connected in the output thereof being a D.-C. amplifier which is cut off responsive to flux reversal of said saturable reactor to said first direction.

16. A trip device for circuit interrupters having a trip element therein, said circuit interrupter being operated responsive to a change in energization of said trip element; said trip device comprising a saturable reactor and control circuits therefor, said saturable reactor being electrically connected to said trip element to control the energization thereof responsive to the flux condition of said saturable reactor; said control circuits comprising a first circuit for biasing said saturable reactor flux in a first direction and being responsive to current through said circuit interrupter, and a second circuit connected to apply a predetermined bias to said saturable reactor in a second direction; said saturable reactor normally being biased to saturation in said second direction; the flux of said saturable reactor being reversed toward said first direction when said current through said circuit interrupter exceeds a predetermined value to thereby change the energization of said trip element and operate said circuit interrupter; said second circuit including positive feed back means for rapidly decreasing said predetermined bias responsive to an initial flux change in said saturable reactor from said second direction to said first direction; said control circuits for said saturable reactor further including a blocking circuit; said blocking circuit being connected to said saturable reactor to strongly bias said saturable reactor in said second direction for a predetermined length of time after the closing of said circuit interrupter to prevent reversal of the flux of said saturable reactor to said first direction regardless of the magnitude of current through said circuit interrupter; said saturable reactor being part of a magnetic amplifier having said trip element connected to the output thereof, said control circuits forming the input control of said magnetic amplifier for altering the energization of said trip element responsive to a predetermined current through said interrupter; said trip element being normally energized by A.-C. current when said circuit interrupter is closed; said magnetic amplifier being an A.-C. amplifier having said trip element connected in the output thereof which is cut off responsive to flux reversal of said saturable reactor to said first direction.

17. A trip device for circuit interrupters having a trip element therein, said circuit interrupter being operated responsive to a change in energization of said trip element; said trip device comprising an amplifier and input control circuits therefor, said amplifier having said trip element connected in the output thereof and controlling the change in energization of said trip element responsive to said input control circuits; said control circuits comprising a first circuit for biasing said amplifier in a first direction and being responsive to current through said circuit interrupter and a second circuit for applying an opposite bias of a predetermined magnitude to said amplifier; said bias of said second circuit being normally large enough to overcome said first circuit bias when said current through said circuit interrupter is in a predetermined direction; said first circuit bias overcoming said second circuit bias when said circuit interrupter current exceeds a predetermined value to cause a change in the output of said amplifier and in said trip element to operate said circuit interrupter; said second circuit being interconnected with said first circuit to initiate deenergization of said second circuit bias responsive to said circuit interrupter current exceeding said predetermined value.

18. A trip device for circuit interrupters having a trip element therein, said circuit interrupter being operated responsive to a change in energization of said trip element; said trip device comprising an amplifier and input control circuits therefor, said amplifier having said trip element connected in the output thereof and controlling the change in energization of said trip element responsive to said input control circuits; said control circuits comprising a first circuit for biasing said amplifier in a first direction and being responsive to current through said circuit for applying an opposite bias of a predetermined magnitude to said amplifier; said bias of said second circuit being large enough to overcome said first circuit bias when said current through said circuit interrupter is in a predetermined direction; said first circuit bias overcoming said second circuit bias when said circuit interrupter current exceeds a predetermined value to cause a change in the output of said amplifier and in said trip element to operate said circuit interrupter; said second circuit including positive feed back means for rapidly decreasing the net bias of said amplifier input responsive to said increase of said circuit interrupter current beyond said predetermined value.

19. A trip device for circuit interrupters having a trip element therein, said circuit interrupter being operated responsive to a change in energization of said trip element; said trip device comprising an amplifier and input control circuits therefor, said amplifier having said trip element connected in the output thereof and controlling the change in energization of said trip element responsive to said input control circuits; said control circuits comprising a first circuit for biasing said amplifier in a first direction and being responsive to current through said circuit for applying an opposite bias of a predetermined magnitude to said amplifier; said bias of said second circuit being large enough to overcome said first circuit bias when said current through said circuit interrupter is in a predetermined direction; said first circuit bias overcoming said second circuit bias when said circuit interrupter current exceeds a predetermined value to cause a change in the output of said amplifier and in said trip element to operate said circuit interrupter; said control circuits further including a blocking circuit connected to said amplifier input to strongly bias said amplifier in said direction opposite said first bias for a predetermined length of time after the closing of said circuit interrupter to prevent the net input bias from going in said first direction regardless of the magnitude of current through said circuit interrupter; said second circuit being interconnected with said first circuit to initiate deenergization of said second circuit bias responsive to said circuit interrupter current exceeding said predetermined value.

References Cited in the file of this patent
UNITED STATES PATENTS

| | | |
|---|---|---|
| 1,787,181 | Traver | Dec. 30, 1930 |
| 2,376,767 | Fountain | May 22, 1945 |
| 2,518,865 | Cartotto | Aug. 15, 1950 |
| 2,706,765 | Lengvenis | Apr. 19, 1955 |